(12) United States Patent
Sofer et al.

(10) Patent No.: US 8,896,341 B2
(45) Date of Patent: Nov. 25, 2014

(54) INTEGRATED CIRCUIT DEVICE, CALIBRATION MODULE, AND METHOD THEREFOR

(75) Inventors: Sergey Sofer, Rishon Letzion (IL); Yefim-Haim Fefer, Petah-Tikva (IL); Pavel Livshits, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 195 days.

(21) Appl. No.: 13/634,726

(22) PCT Filed: Jun. 10, 2010

(86) PCT No.: PCT/IB2010/052592
§ 371 (c)(1),
(2), (4) Date: Sep. 13, 2012

(87) PCT Pub. No.: WO2011/154774
PCT Pub. Date: Dec. 15, 2011

(65) Prior Publication Data
US 2013/0038373 A1  Feb. 14, 2013

(51) Int. Cl.
*H03K 17/16* (2006.01)
*H03K 19/003* (2006.01)
*H04L 25/02* (2006.01)

(52) U.S. Cl.
CPC .................. *H04L 25/0278* (2013.01)
USPC .................. 326/30; 326/33; 326/82

(58) Field of Classification Search
None
See application file for complete search history.

(56) References Cited

U.S. PATENT DOCUMENTS

| | | | |
|---|---|---|---|
| 6,566,911 B1 | 5/2003 | Moyer | |
| 6,807,650 B2 | 10/2004 | Lamb et al. | |
| 7,969,181 B1 * | 6/2011 | Fefer et al. | 326/30 |
| 2008/0130717 A1 | 6/2008 | Obermeyer et al. | |
| 2009/0278565 A1 | 11/2009 | Nguyen et al. | |
| 2010/0321059 A1 * | 12/2010 | Nakatsu | 326/30 |
| 2012/0176156 A1 * | 7/2012 | Chang et al. | 326/62 |

OTHER PUBLICATIONS

A.P.J. et al. "Pulsed Current-Mode Signaling for Nearly Speed-of-Light Intrachip Communication", in: IEEE Journal of Solid-State Circuits, vol. 41, No. 4, Apr. 2006, pp. 772-780.
G.B. et al. "A Scalable 5-15 GBPS, 14-75 mW Low-Power IO Transceiver in 6 5 nm CMOS", In: IEEE Journal of Solid-State Circuits, vol. 43, No. 4, Apr. 2008, pp. 1010-1018.
International Search Report and Written Opinion correlating to PCT/IB2010/052592 dated Mar. 18, 2011.

* cited by examiner

*Primary Examiner* — Jany Richardson

(57) ABSTRACT

An integrated circuit device comprising at least one calibration module for calibrating an impedance of at least one on-die interconnect line driver in order to adaptively match an impedance between the at least one on-die interconnect line driver and at least one on-die interconnect line conjugated thereto. The at least one calibration module is arranged to receive an indication of an output signal of the at least one line driver, compare the received indication of an output signal to a reference signal and detect a presence or an absence of a voltage overshoot of the output signal of the at least one line driver, and upon detection of a presence or an absence of a voltage overshoot of the output signal of the at least one line driver, cause the adjustment of power supply of the at least one line driver, to be decreased or increased correspondingly.

12 Claims, 5 Drawing Sheets

INTEGRATED CIRCUIT DEVICE, CALIBRATION MODULE, AND METHOD THEREFOR

FIELD OF THE INVENTION

This invention relates to an integrated circuit device, a calibration module, and a method for calibrating an impedance of at least one on-die interconnect line driver therefor.

BACKGROUND OF THE INVENTION

Integrated circuit devices typically comprise various on-die signal and data interconnects with which integrated circuit device components are able to transmit and receive electrical signals and data to and from other on-die components, such as other functional units of the same integrated circuit device. For the transmission of signals over such on-die interconnects, integrated circuit devices typically comprise line receivers and drivers arranged to receive and transmit signals over the on-die interconnects.

In order to ensure correct data transfer across an on-die interconnect, the influence of the interconnect's parasitic characteristics on the signal quality must be minimised to an acceptable (low) level. One known method widely used in VLSI (Very Large Scale Integration) processes for reducing the influence of parasitic characteristics of on-die interconnects comprises dividing an interconnect line into a plurality of short sections by inserting multiple repeaters along the interconnect. However, a problem with this method is that these repeaters are associated with excessive power consumption, signal propagation delay and occupied die area. Furthermore, these problems are amplified with increases in chip scale integration and signal rate.

Another known technique for minimising the influence of parasitic characteristics of on die interconnects comprises strict impedance matching between the on-die interconnect driver and interconnect line. Accurate and consistent impedance matching between on-die line drivers and their corresponding on-die interconnects for all dies of a particular product is not practically possible during the design stage due to significant production process variations and model limitations. Future variations of the ambient temperature and operating voltage aggravate the situation. If such mismatching of impedances is not taken into consideration in the design of integrated circuit chip, the integrity of transmitted signals may be jeopardized, and chip reliability compromised. Accordingly, it is necessary for integrated circuit systems to be designed to be tolerant of a degree of line driver/interconnect impedance mismatching. However, such tolerance to line driver/interconnect impedance mismatching typically cannot be achieved while required high system performance is preserved due to an inevitable degradation of the operating speed of the system, and increased power consumption.

Significantly, modern integrated circuit devices are required to provide increasingly high performance, whilst concurrently they are required to meet increasingly stringent power consumption and thermal energy dissipation requirements.

SUMMARY OF THE INVENTION

The present invention provides an integrated circuit device, a calibration module, and a method for calibrating at least one on-die interconnect line driver as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
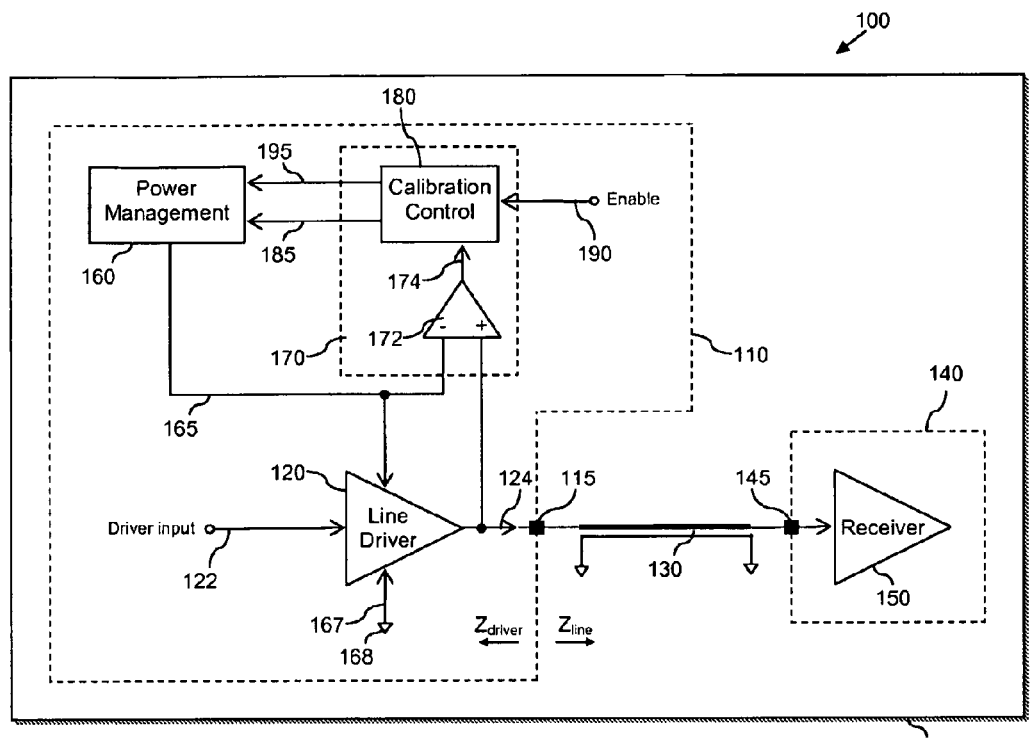
FIG. 1 illustrates an example of an integrated circuit arrangement.

Referring now to FIG. 1, there is illustrated an example of an integrated circuit arrangement 100 comprising an integrated circuit device 105 according to some embodiments of the present invention. For the illustrated example, the integrated circuit device 105 comprises a first functional unit 110 comprising one or more line drivers, such as line driver 120, for driving signals over one or more on-die interconnect lines, such as interconnect line 130. The integrated circuit device 105 of FIG. 1 further comprises a second functional unit 140 comprising one or more line receivers, such as line receiver 150, for receiving signals over one or more on-die interconnect lines, such as interconnect line 130.

For the illustrated example, the line driver 120 is arranged to receive an input signal 122 to be transmitted, and to drive an output signal 124 thereof to a high or low voltage level in accordance with the received input signal 122. The line driver 120 is operably coupled to a high supply voltage 165 for driving the output signal 124 to a high voltage level, which for the illustrated example is provided by a power management module 160. The line driver is further operably coupled to a low supply voltage 167 for driving the output signal 124 to a low voltage level, which for the illustrated example is provided by a ground plane 168. The output signal of the line driver 120 is provided to an on-die contact 115 of the first functional unit 110. The interconnect line 130 is operably coupled between the contact 115 of the first functional unit 110 and an on-die contact 145 of the second functional unit 140, and is arranged to convey signals between the contacts 115, 145 of the first and second functional units 110 and 140. In particular for the illustrated example, the interconnect line 130 is arranged to convey signals provided to the contact 115 of the first functional unit 110 by the line driver 120 to the contact 145 of the second functional unit 140. An input of the receiver 150 is operably coupled to the contact 145 of the second functional unit, and is arranged to receive signals conveyed thereto by the interconnect line 130. The receiver 150 may conventionally comprise MOSFET gates that are associated with high input impedance, for example a high active resistance and a low capacitance. Thus, for such an example, interconnect line 130 may be terminated in a substantially open ended manner.

Figure 2:
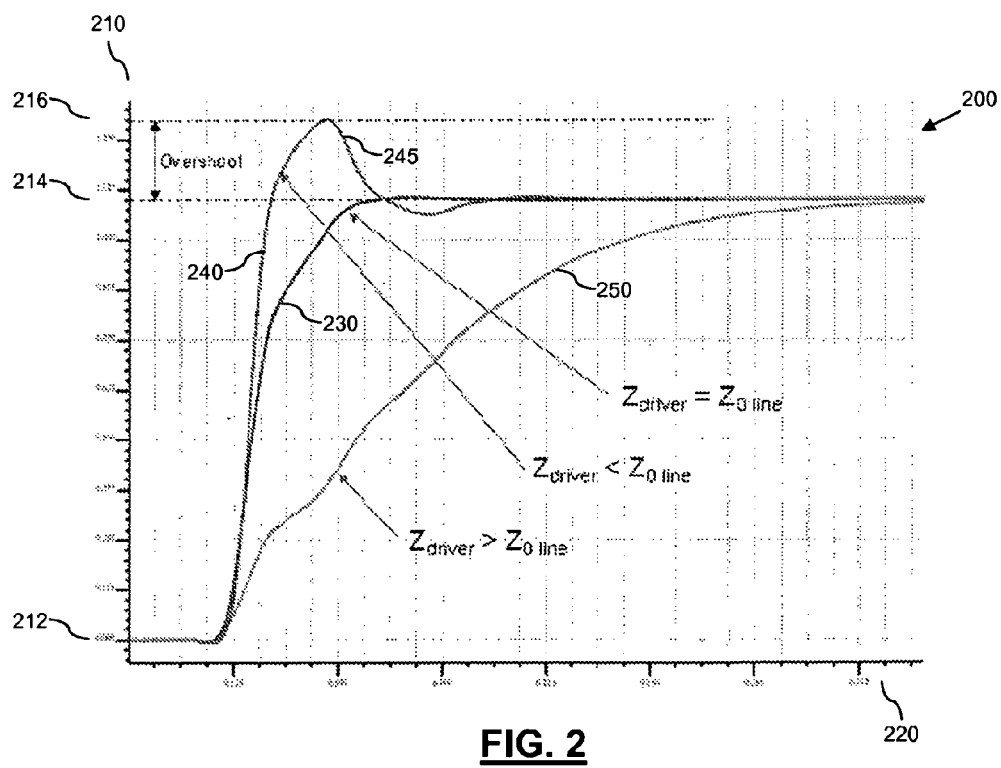
FIG. 2 illustrates a graph of voltage over time for examples of line driver output signals.

FIG. 2 illustrates a graph 200 of voltage 210 over time 220. The graph 200 comprises a first plot 230 of an example of an output signal of a line driver, such as the line driver 120 of FIG. 1, where the line driver is driving the output signal from a low voltage level 212 to a high voltage level 214. For this first plot 230, the impedance of the line driver $Z_{driver}$ (as presented to an on-die interconnect line coupled thereto) is substantially equal to the impedance of an on-die interconnect line coupled thereto $Z_{line}$ (as presented to the line driver). In this manner, the impedances of the line driver and the interconnect line are 'matched'. Accordingly, the line driver is able to achieve a fast transition of its output signal from the low voltage level 212 to the high voltage level 214 with substantially no voltage overshoot.

The graph 200 also comprises a second plot 240 of an output signal of a line driver also driving its output signal from a low voltage level 212 to a high voltage level 214. However, for this second plot 240, the impedance of the line driver $Z_{driver}$ is less than the impedance of an on-die interconnect line coupled thereto $Z_{line}$, and as such the impedances of the line driver and the interconnect line are 'mismatched'. As a result, although the line driver is able to achieve a fast transition of its output signal from the low voltage level 212 to the high voltage level 214, because the impedance of the line driver $Z_{driver}$ is less than the impedance of an on-die interconnect line coupled thereto $Z_{line}$, a reflection of the transmitted signal from the far end of the interconnect line 130 results in voltage overshoot of the output signal, as illustrated generally at 245, to an excessively high voltage level 216 before dropping back down and settling at the required high voltage level 214. Such an overshoot not only signifies that excessive power is being used by the line driver to achieve the transition from the low voltage level 212 to the high voltage level 214, but also is likely to be a source of avoidable noise.

The graph 200 further comprises a third plot 250 of an output signal of a further line driver also driving its output signal from a low voltage level 212 to a high voltage level 214. However, for this third plot 250, the impedance of the line driver $Z_{driver}$ is higher than the impedance of an on-die interconnect line coupled thereto $Z_{line}$, and as such the impedances of the line driver and the interconnect line are again 'mismatched'. In this instance, because the impedance of the line driver $Z_{driver}$ is higher than the impedance of an on-die interconnect line coupled thereto $Z_{line}$, the fast transition of its output signal from the low voltage level 212 to the high voltage level 214 cannot be achieved. As a result, there is a significant delay in the output signal of the line driver reaching the desired high voltage level 214. Such a delay in a signal transition can have a significant effect on the integrity of signals being transmitted by the line driver over the interconnect line.

In contrast to the known art, it has been recognised and appreciated that it is possible to achieve an impedance matching between a line driver and an interconnect line coupled thereto by adjusting a supply voltage of the line driver to thereby adjust the strength of the line driver.

Referring back to FIG. 1, the first functional unit 110 further comprises a calibration module 170 for calibrating an impedance of the line driver 120 in order to adaptively match an impedance between the line driver 120 and one or more interconnect lines 130 coupled thereto. In summary, the calibration module 170 is arranged to receive an indication of the output signal 124 (which may in some examples comprise receiving the output signal itself) of the line driver 120, compare the received indication of the output signal 124 to a reference signal, which for the illustrated example comprises the high supply voltage 165, to detect a voltage overshoot of the output signal 124, and upon detection of a voltage overshoot of the output signal 124, to cause a power supply of the line driver to be decreased. In this manner, upon detection of a voltage overshoot, the line driver 120 may be calibrated by way of its power supply such that a matched impedance may be substantially achieved between the line driver 120 and an interconnect line 130 coupled thereto. Accordingly, excessive power consumption and noise resulting from the detected voltage overshoot may be substantially alleviated.

Although examples of the invention will now be described with reference to adjusting a power supply of the at least one line driver 120, those skilled in the art may appreciate that this adjusting comprises either voltage or current regulation, such as providing power supply voltage or power supply current regulation, causing adjustment of the driver current of the at least one line driver 120. Thus, the term 'power supply' in the context of the hereinafter description and associated claims encompasses all such power delivery mechanisms and quantitative adjustments.

More specifically for the example illustrated in FIG. 1, the calibration module 170 comprises a voltage comparator 172 arranged to compare a voltage level of the output signal 124 of the line driver to a reference voltage signal, and thereupon to output an indication 174 of whether a voltage overshoot has been detected. For the illustrated example, the reference voltage signal to which the voltage level of the output signal 124 is compared comprises the high supply voltage 165 provided by the power management module 160. The calibration module 170 further comprises a calibration control unit 180 arranged to receive the indication 174 output by the voltage comparator 172 of whether a voltage overshoot has been detected, and to calibrate a power supply for the line driver 120 based at least partly on the received indication of whether a voltage overshoot has been detected. For the illustrated example, the calibration control unit 180 is operably coupled to the power management module 160, and arranged to provide a power supply calibration signal 185 thereto to calibrate a power supply for the line driver 120, which for the illustrated example comprises the high supply voltage signal 165 output by the power management module 160.

In accordance with some example embodiments of the present invention, upon receipt of an indication that a voltage overshoot has been detected, the calibration control unit 180 may be arranged to configure a decrease of the high supply voltage 165 provided to the line driver 120. In this manner, the strength (conductivity) of the MOSFETs composing the line driver 120 may be reduced in order to increase the impedance of the line driver 120 such that the matching of the impedances of the line driver 120 and the interconnect line 130 is improved. As a result, the likelihood of subsequent voltage overshoots may be reduced, and excessive power consumption and noise resulting from voltage overshoots may be substantially alleviated.

In accordance with some further example embodiments of the present invention, upon receipt of an indication that a voltage overshoot has not been detected, the calibration control unit 180 may be arranged to configure an increase of the high supply voltage 165 provided to the line driver 120. In this manner, the strength (conductivity) of the line driver 120 may be increased, for example until an overshoot indication is received, in order to decrease the impedance of the line driver 120. As such, any mismatch between the impedances of the line driver 120 and the interconnect line 130 caused by the line driver 120 comprising too low an impedance may be reduced. Accordingly, a delay in the output signal 124 of the line driver 120 reaching a desired high voltage level may be substantially minimised, thereby improving the integrity of signals being transmitted by the line driver 120 over the interconnect line 130.

Figure 3:
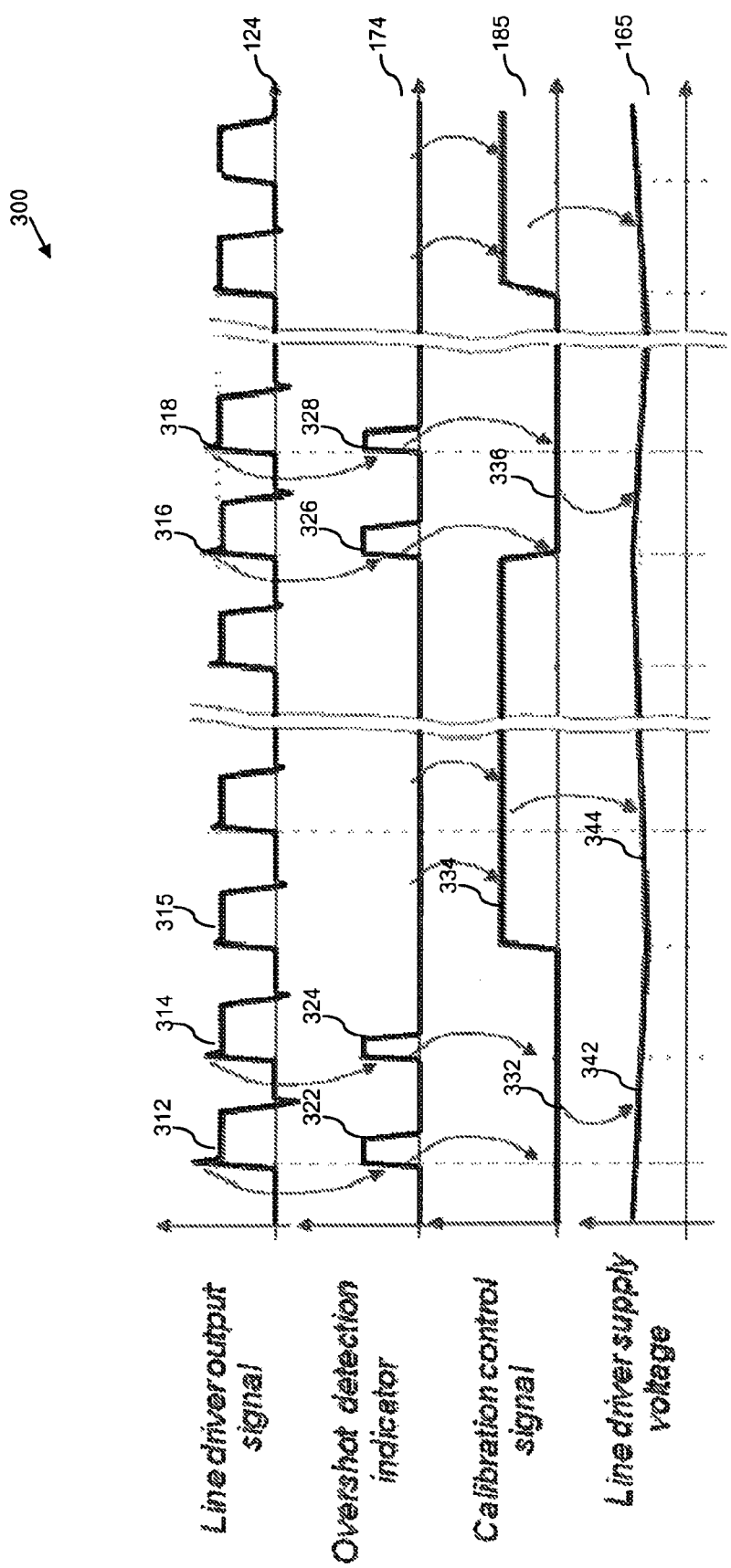
FIG. 3 illustrates an example of a timing diagram.

FIG. 3 illustrates an example of a timing diagram 300 showing examples of signal timings for the integrated circuit arrangement 100 of FIG. 1. The timing diagram 300 comprises timing plots representing the line driver output signal 124, the overshoot indication 174 output by voltage comparator 172, the power supply calibration signal 185 output by the calibration control unit 180, and the high supply voltage 165 provided to the line driver 120 by the power management module 160. For the illustrated example, the line driver output signal 124 comprises a succession of alternating high and low voltage levels, for example as may be generated by a basic test signal.

An initial transition 312 of the line driver output signal 124 (illustrated on the left hand side of the timing diagram 300) from a low voltage level to a high voltage level comprises a voltage overshoot. As mentioned above, the voltage comparator 172 compares the voltage level of the output signal 124 to a reference signal comprising the high supply voltage signal 165. The voltage overshoot of this initial transition 312 causes the voltage level of the output signal 124 to exceed that of the supply voltage signal 165, whereby the voltage comparator 172 detects the voltage overshoot, and outputs an indication that a voltage overshoot has been detected, as indicated at 322. The calibration control unit 180 receives the indication 322 that a voltage overshoot has been detected, and configures the power supply calibration signal 185 to cause a decrease of the voltage level of the high supply voltage signal 165 provided to the line driver 120, as indicated generally at 332. Accordingly, the voltage level of the high supply voltage signal 165 is subsequently reduced by the power management module 160, as illustrated generally at 342.

A subsequent transition 314 of the line driver output signal 124 from a low voltage level to a high voltage level illustrated in FIG. 3 also comprises a voltage overshoot. However, because of the reduction in the voltage level of the high supply voltage signal 165 following detection of the previous voltage overshoot of the initial transition 312, this subsequent voltage overshoot is of a smaller magnitude. Nevertheless, this subsequent voltage overshoot still causes the voltage level of the output signal 124 to exceed that of the supply voltage signal 165, and as such the voltage comparator 172 detects the voltage overshoot, and outputs an indication that a voltage overshoot has been detected, as indicated at 324. The calibration control unit 180 receives the indication 324 that a voltage overshoot has been detected, and configures the power supply calibration signal 185 to cause a further decrease of the voltage level of the high supply voltage signal 165 provided to the line driver 120. Accordingly, the voltage level of the high supply voltage signal 165 is subsequently further reduced by the power management module 160.

For a next transition 315 of the line driver output signal 124 from a low voltage level to a high voltage level illustrated In FIG. 3, because of the further reduction in the voltage level of the high supply voltage signal 165 following detection of the voltage overshoot of the second transition 314, substantially no overshoot occurs. Accordingly, upon comparison of the voltage level of the output signal 124 to the high supply voltage signal 165, no overshoot is detected. Thus, the voltage comparator 172 outputs an indication that no voltage overshoot has been detected, or more specifically for the illustrated example, does not output an indication that a voltage overshoot has been detected. The calibration control unit 180 receives the indication that no voltage overshoot has been detected, and configures the power supply calibration signal 185 to cause an increase of the voltage level of the high supply voltage signal 165 provided to the line driver, as indicated generally at 334. Accordingly, the voltage level of the high supply voltage signal 165 is subsequently increased by the power management module 160, as illustrated generally at 344. In accordance with some examples, configured increases and decreases of the power supply (e.g. the high supply voltage for the illustrated example), in response to the detected absence/presence respectively of voltage overshoots, may be substantially symmetrical.

For the illustrated example, upon subsequent transitions of the line driver output signal 124 from a low voltage level to a high voltage level comprising substantially no voltage overshoots, the calibration control unit 180 continues to configure the power supply calibration signal 185 to cause an increase of the voltage level of the high supply voltage signal 165 provided to the line driver 120. As will be appreciated, by continuing to increase the voltage level of the high supply voltage signal 165 in this manner, a voltage overshoot will eventually occur again in the output signal 124, as illustrated for transitions 316, 318 for the illustrated example. Such voltage overshoots will be detected by the voltage comparator 172, which will output indications that voltage overshoots have been detected, as illustrated at 326, 328. As a result, the calibration control unit 180 will configure the power supply calibration signal 185 to cause a reduction of the voltage level of the high supply voltage signal 165 in response to receiving the indications 326, 328 that voltage overshoots have been detected. In this manner, the voltage level of the high supply voltage signal 165 may be caused to oscillate about a generally optimal voltage level in accordance with the detection of voltage overshoots within the output signal of the line driver 120, and supply voltage calibration performed by the calibration module 170 in response thereto. In particular, such an oscillation of the voltage level of a supply voltage for the line driver based on the detection of voltage overshoots within the output signal of the line driver enables the supply voltage to fluctuate about a generally optimal voltage level providing generally optimal impedance matching between the on-die line driver and the on-die interconnect, whilst substantially avoiding excessively high voltage levels. The stability of such an oscillation may be ensured by a typically narrow bandwidth of the alternating current (AC) characteristics of the power management module 160.

The local dedicated power supply variation range for modern technologies (90 nm and below) is typically in the region of +/−100 mV from a nominal voltage level, without the need for level shifters. Such a variation range has been found to be sufficient for achieving the desired line driver calibration, and in particular the desired impedance matching between the line driver and the interconnect line.

For the example illustrated in FIG. 3 the power supply calibration signal 185 comprises a simple 'high/low' signal arranged to cause the power management module 160 to simply increase or decrease the voltage level of the high voltage signal 165. In accordance with alternative example embodiments of the present invention, the power supply calibration signal 185 may alternatively comprise a more complex arrangement.

For example, the power supply calibration signal 185 may comprise, say, a multi-bit binary signal arranged to indicate an amount by which to increase or decrease the supply voltage signal 165 by. For example, upon receiving an initial indication that a voltage overshoot has been detected, the configuration control unit 180 may be arranged to configure the power supply calibration signal 185 to cause the power management module 160 to decrease the voltage level of the high supply voltage signal 165 by a base amount.

Upon receiving further indications that a voltage overshoot has been detected within subsequent consecutive clock cycles, the calibration control unit 180 may be arranged to decrement the value of the power supply calibration signal 185 to cause the power management module to decrease the voltage level of the high voltage signal 165 by an incrementally increasing amount. Upon subsequent receipt of an indication that no voltage overshoot has been detected, the calibration control unit 180 may then be arranged to configure the power supply calibration signal 185 to cause the power management module 160 to decrease the voltage level of the high supply voltage signal 165 by a base amount.

Similarly, upon receiving further indications that no voltage overshoot has been detected within subsequent consecutive clock cycles, the calibration control unit 180 may be arranged to increment the value of the power supply calibration signal 185 to cause the power management module to increase the voltage level of the high voltage signal 165 by an incrementally increasing amount.

Alternatively, the power supply calibration signal 185 may comprise, say, a multi-bit binary signal arranged to indicate an actual voltage level to which the power management module 160 is to set the high supply voltage signal to. In this manner, the calibration control unit 180 may be arranged to decrement a voltage level indication value for each clock cycle that an indication that a voltage overshoot has been detected is received, and to increment the voltage level indication value for each clock cycle that an indication that a voltage overshoot has not been detected is received. The calibration control unit 180 may then configure the power supply calibration signal 185 according to the voltage level indication value.

Additionally, in FIG. 3, the voltage level of the supply voltage signal 165 is illustrated as being increased or decreased in a generally linearly continuous, gradual manner. However, as mentioned above in relation to the power supply calibration signal 185, it is contemplated that the voltage level of the supply voltage signal 165 may be increased or decreased in a step-wise manner. Furthermore, such increases or decreases of the supply voltage signal 165 are not limited to being substantially linear, but rather may be of variable magnitude. For example, and as mentioned above in relation to the power supply calibration signal 185, it is contemplated that the magnitude of increases or decreases in the voltage level of the supply voltage signal 165 may be varied depending on the number of consecutive clock cycles over which a voltage overshoot is detected or not detected.

For the purpose of simplicity, the driven signal 124 of the illustrated example may comprise a generally clock-like signal, for example as may be provided by way of a test signal. However, the inventive concept is not limited to the use of such a simple clock-like signal for the calibration process herein before described, and it is envisaged that an alternative signal comprising a more complex sequence of state transitions may be used. Furthermore, and in accordance with some example embodiments, the driven signal 124 may alternatively comprise a functional signal, such as a data signal. In order for a more complex sequence of state transitions to be used, the comparator 172 and/or calibration control 180 of the calibration module 170 may require to be synchronised with transition edges of the received signal in order to accurately identify when an overshoot condition has occurred.

In accordance with some example embodiments of the present invention, and as illustrated in FIG. 1, the calibration module 170 may be arranged to receive an enable signal, as illustrated generally at 190, and to initiate a calibration of the line driver 120 upon the enable signal being set. For example, a signal processing module (not shown) of the integrated circuit device 110, such a central processing unit (CPU), microcontroller, digital signal processor (DSP) or the like, may be arranged to initiate line driver calibration upon one or more specific events occurring, for example as part of a boot up or system initiation sequence, upon the expiration of a timer, etc. The signal processing module (not shown) may initiate line driver calibration by providing a test signal to the input of one or more line drivers, for example such a test signal comprising a succession of alternating high and low voltage levels as illustrated in FIG. 2, and by setting the enable signal 190.

Upon the enable signal 190 being set, the calibration module 170 may then calibrate the supply voltage signal 165 as described above, and thereby calibrate the line driver 120. The calibration module 170 may be arranged to continuously perform a calibration of the line driver 120 until the enable signal 190 becomes unset. Alternatively, the calibration module 170 may be arranged to perform a calibration of the line driver 120 for a set period of time (for example for a certain number of clock cycles). Alternatively, the calibration module 170 may be arranged to perform calibration of the line driver 120 until a substantially stable oscillation of the voltage level of the supply voltage signal 165 is achieved, for example as indicated by a stable oscillation of the indication 174 of whether a voltage overshoot has been detected.

In accordance with some example embodiments of the present invention, the calibration control unit 180 may further be arranged to output a calibration control signal 195, which is received by the power management module 160, and which indicates to the power management module 160 when calibration of the supply voltage signal 165 is being performed. For example, when the calibration control signal 195 is 'set' by the calibration control unit 180, the power management module 160 configures the supply voltage signal 165 in accordance with the power supply calibration signal 185. When the calibration control signal 195 is subsequently 'unset' by the calibration control unit 180, the power management module 160 may subsequently maintain the current voltage level of the supply voltage signal 165. In accordance with some alternative example embodiments of the present invention, the power management module 160 may alternatively be arranged to receive the enable signal 190, and to configure the supply voltage signal 165 in accordance with the power supply calibration signal 185 upon the enable signal 190 being set.

For the example embodiments illustrated in FIG. 1, the calibration module 170 forms an integral part of the functional unit 110, and is arranged to receive an indication 124 of the output signal of the line driver 120 to be calibrated from a point close to the line driver 120. However it is contemplated that the present invention is not limited to the calibration module 170 and line driver 120 being provided within the same functional unit 110, nor to the calibration module 170 being arranged to receive an indication 124 of the output signal of the line driver 120 to be calibrated from a point at an output of the line driver 120.

Figure 4:
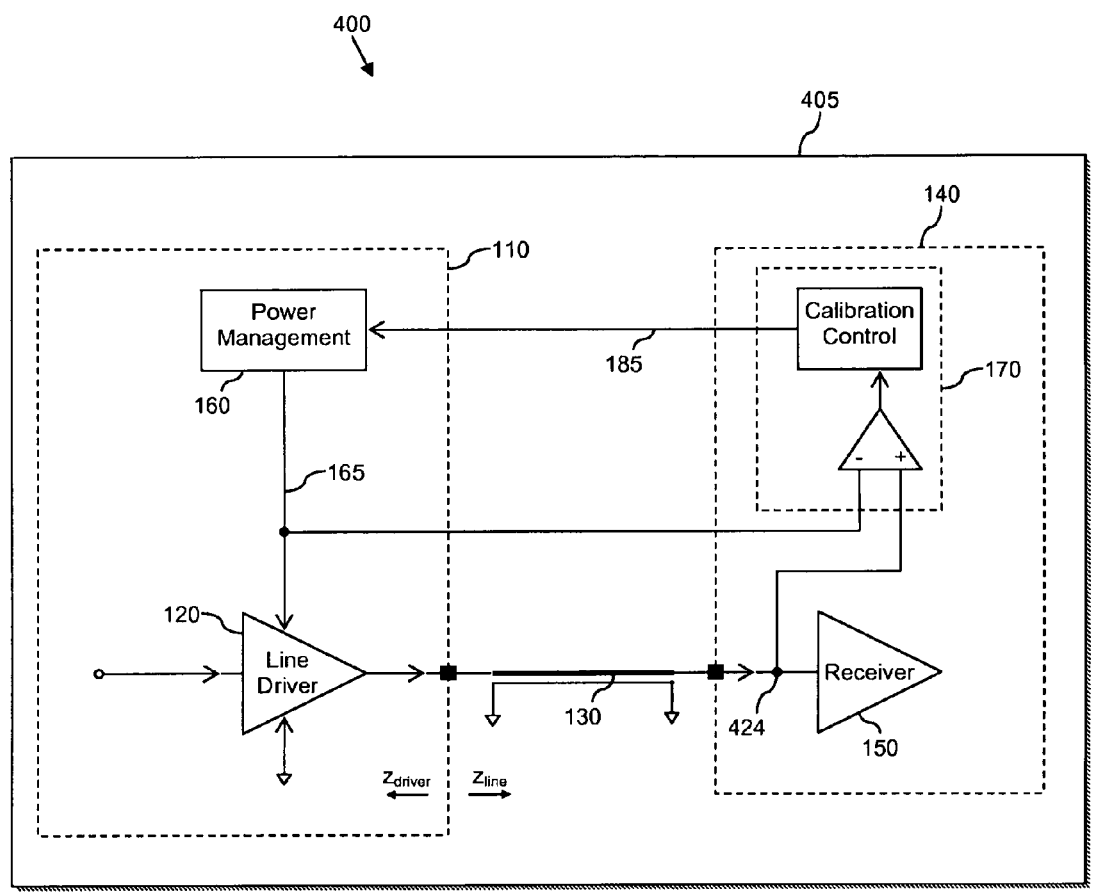
FIG. 4 illustrates an alternative example of an integrated circuit arrangement.

For example, referring to FIG. 4 there is illustrated an example of an integrated circuit arrangement 400 comprising integrated circuit device 405 according to some alternative embodiments of the present invention. In the same manner as for the example illustrated in FIG. 1, the integrated circuit arrangement 400 of FIG. 4 comprises a first functional unit 110 comprising one or more line drivers, such as line driver 120, for driving signals over one or more on-die interconnect lines, such as interconnect line 130. The integrated circuit arrangement 400 of FIG. 4 further comprises a second functional unit 140 of the integrated circuit device 405 comprising one or more line receivers, such as line receiver 150, for receiving signals over one or more on-die interconnect lines, such as interconnect line 130. However, for the example illustrated in FIG. 4, the calibration module 170 forms a part of the second functional unit 140, and the calibration module 170 is arranged to receive an indication 424 of the output signal of the line driver 120 to be calibrated from a point at a far end of the interconnect, at an input of the receiver 150.

Figure 5:
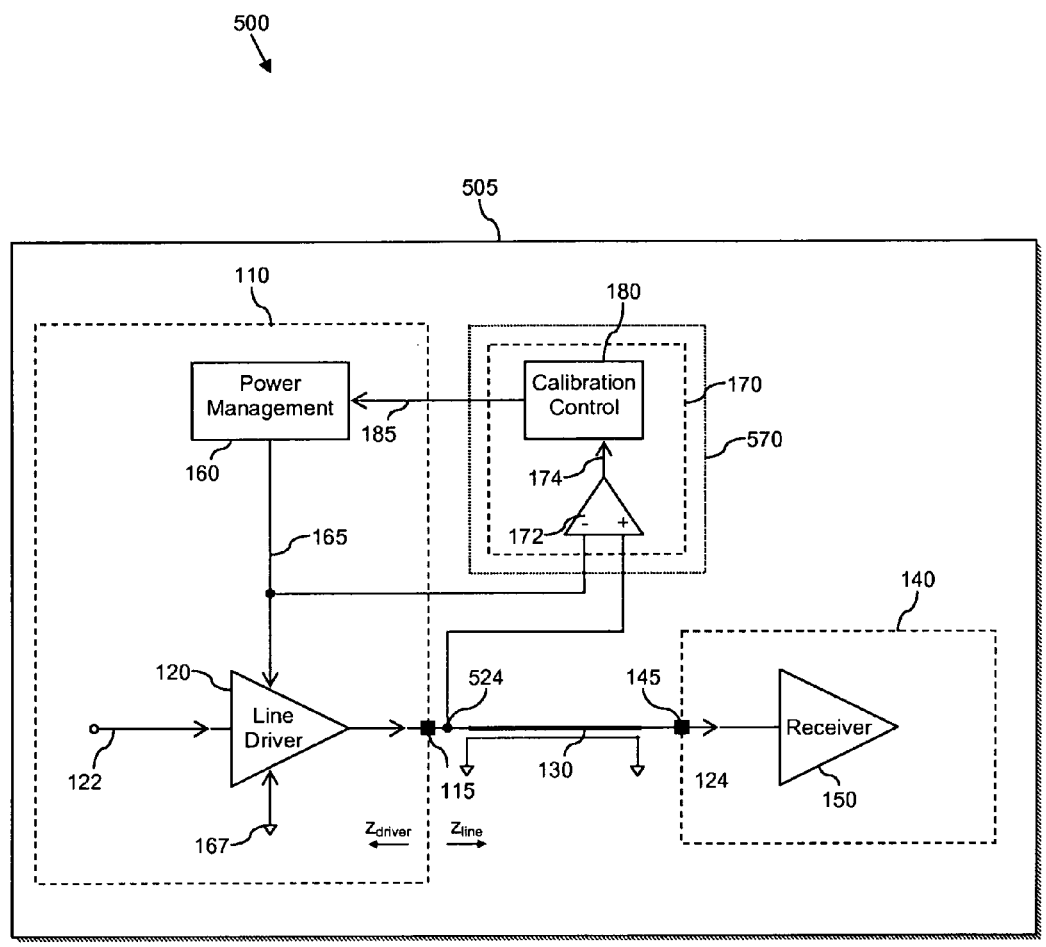
FIG. 5 illustrates a further alternative example of an integrated circuit arrangement.

FIG. 5 illustrates an example of an integrated circuit arrangement 500 comprising integrated circuit device 505 according to some further alternative embodiments of the present invention. In the same manner as for the examples illustrated in FIGS. 1 and 4, the integrated circuit arrangement 500 of FIG. 5 comprises a first functional unit 110 comprising one or more line drivers, such as line driver 120, for driving signals over one or more on-die interconnect lines, such as interconnect line 130. The integrated circuit arrangement 500 of FIG. 5 further comprises a second functional unit 140 comprising one or more line receivers, such as line receiver 150, for receiving signals over one or more on-die interconnect lines, such as interconnect line 130. However, for the example illustrated in FIG. 5, the calibration module 170 forms a part of a third functional unit 570, and the calibration module 170 is arranged to receive an indication 524 of the output signal of the line driver 120 to be calibrated from a point between the first and second functional unit 110, 140, which for the illustrated example is from a point close to the driver but may equally be from a point close to the receiver.

For the illustrated examples, the calibration module 170 has been arranged to calibrate a single line driver 120, and the line driver 120 for the illustrated examples has been arranged to drive a single interconnect line 130. However, it is contemplated that a calibration module adapted in accordance with some example embodiments of the present invention may be arranged to receive an indication of an output of one line driver, and to calibrate one or more supply voltage(s) provided to a plurality of line drivers based on a detection of a voltage overshot of the received output signal indication of the one line driver. Furthermore, a calibration module adapted in accordance with some alternative example embodiments of the present invention may be arranged to receive a plurality of indications of output signals from a plurality of line drivers, and accordingly may be arranged to calibrate supply voltages for the plurality of line drivers. Furthermore, it is contemplated that a single integrated circuit device may comprise more than one calibration module. For example, depending on the size and complexity of the integrated circuit device, a single calibration module may be arranged to calibrate one or more supply voltages for all line drivers of the integrated circuit device, or just to calibrate one or more supply voltages for line drivers within only a part of the integrated circuit device. For example, line drivers within an integrated circuit device may be arranged into a plurality of line driver clusters, with each cluster being calibrated by a separate calibration module.

For the specific examples illustrated in FIGS. 1, 4 and 5, there have been described calibration modules 170, 570 for calibrating an impedance of at least one on-die interconnect line drivers 120, for example an on-die VLSI interconnect line drive, in order to adaptively match an impedance between the at least one on-die interconnect line driver 120 and at least one on-die (conjugated) interconnect line 130 coupled thereto (on the same die). The at least one on-die (conjugated) interconnect line 130 may be treated as a transmission line with distributed parameters, rather than a fully lumped line terminated in an open circuit. For these illustrated examples, the calibration modules 170, 570 have been arranged to calibrate the impedance of the one or more line drivers 120 by way of adapting (e.g. increasing and/or decreasing) a voltage supply of the line drivers 120. However, alternative examples of calibration modules adapted in accordance with the present invention may equally be arranged to calibrate the impedance of one or more line drivers by way of adapting (e.g. increasing and/or decreasing), say, a current supply of the line drivers. One example mechanism to achieve this has been described using a driver power supply adjustment based on monitoring of a presence or absence of an overshoot of the driven signal, for example caused by reflections due to the impedance mismatch between the aforementioned on-die line driver and the on-die interconnect line.

Figure 6:
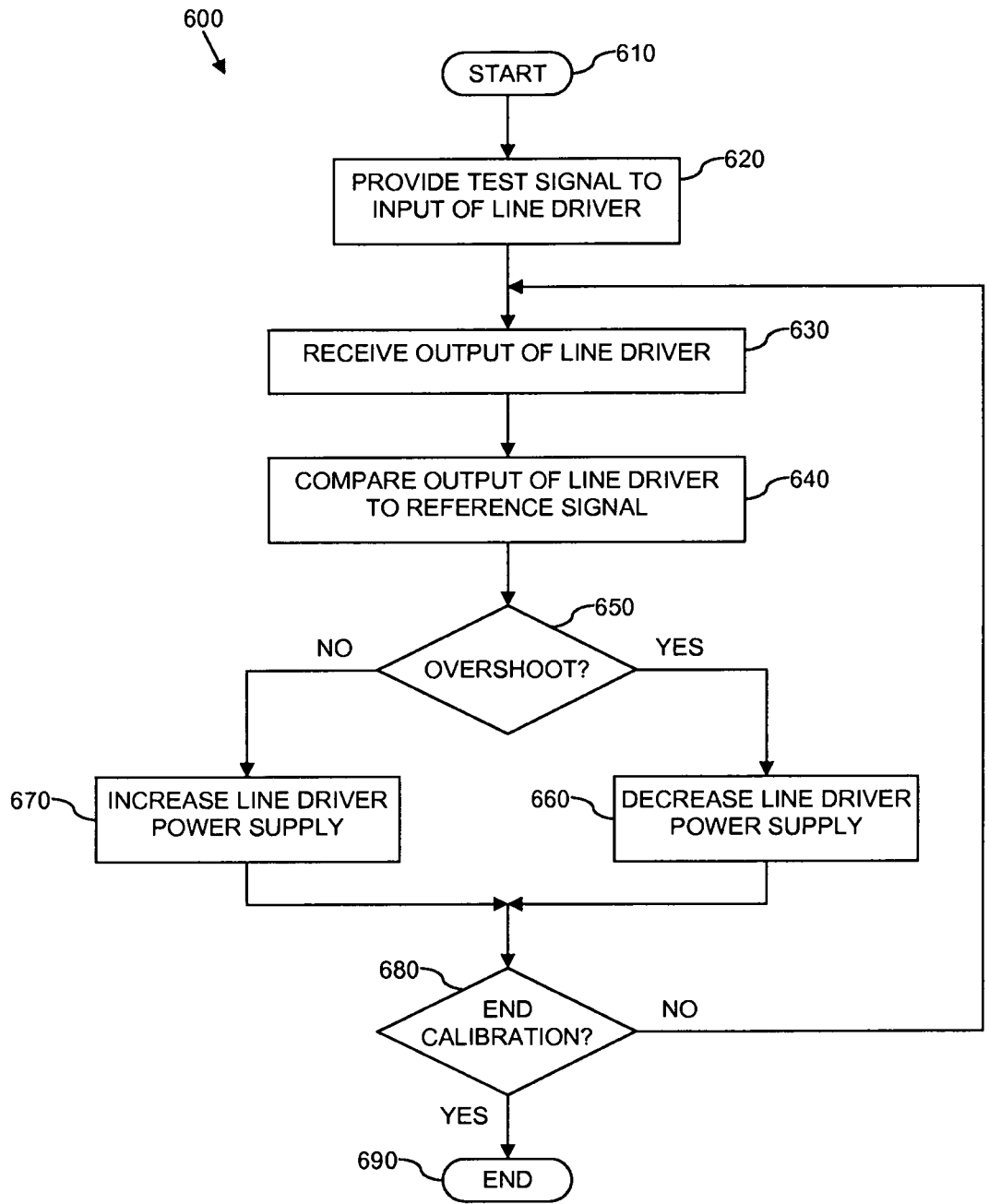
FIG. 6 illustrates a simplified flowchart of a method for calibrating at least one on-die interconnect line driver.

Referring now to FIG. 6, there is illustrated a simplified flowchart 600 of a method for calibrating at least one on-die interconnect line driver. In summary, the method comprises receiving an indication of an output signal of the at least one line driver, comparing the received indication of an output signal to a reference signal to detect a voltage overshoot of the line driver output signal, and upon detection of a voltage overshoot of the line driver output signal, to cause a power supply of the at least one line driver to be decreased.

In more detail, the method illustrated in FIG. 6 starts at step 610, and moves on to step 620 where a signal (that may comprise a test signal or a functional signal) is provided to an input of a line driver. Next, at step 630, an indication of an output signal from the line driver is received. The received indication of the output signal is then compared to a reference signal at step 640. If, at step 650, a voltage overshoot is detected in the output signal of the line driver, the method moves on to step 660, where a power supply for the line driver is decreased. Conversely, if at step 660 a voltage overshoot is not detected in the output signal of the line driver, the method moves on to step 670, where a power supply for the line driver is increased. At step 680, it is determined whether calibration of the line driver is to end, for example based on the expiry of a timer, a stable oscillation of the power supply for the line driver being achieved, etc. If it is determined that calibration of the line driver is to end, the method moves on to step 690, and ends. Conversely, if it is determined that the calibration of the line driver is not to end, the method loops back to step 630.

Although examples of the invention have been described with reference to adjusting a power supply of the at least one line driver (126), alternative examples may employ, for example, adjusting driver current of the at least one line driver (120).

Some or all of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for clarity the calibration module 170 has been illustrated and described as a separate logic block to the power management module 160. However, it will be appreciated that the calibration module may equally form an integral part of the power management module 160.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
at least one calibration module for calibrating an impedance of at least one on-die interconnect line driver in order to adaptively match an impedance between the at least one on-die interconnect line driver and at least one on-die interconnect line conjugated thereto, the at least one calibration module being arranged to receive an indication of an output signal of the at least one interconnect line driver, to compare the received indication of the output signal to a reference signal, and to detect at least one from a group consisting of:
   a presence of a voltage overshoot of the output signal of the at least one interconnect line driver, and upon said presence detection to cause a power supply of the at least one line driver to be decreased; and
   an absence of a voltage overshoot of the output signal of the at least one interconnect line driver, and upon said absence detection to cause the power supply of the at least one line driver to be increased.

2. The integrated circuit device of claim 1 wherein the at least one calibration module comprises a voltage comparator arranged to compare a voltage level of the output signal of the at least one line driver to a reference voltage signal, and thereupon to output an indication of whether or not a voltage overshoot has been detected.

3. The integrated circuit device of claim 2 wherein the reference voltage signal comprises a supply voltage for the at least one line driver.

4. The integrated circuit device of claim 3 wherein the at least one calibration module further comprises a calibration control unit arranged to:
   receive from the voltage comparator the indication of the output signal; and based thereon, calibrate the power supply of the at least one line driver, based at least partly on the received indication.

5. The integrated circuit device of claim 3 wherein, upon receipt of an indication that a voltage overshoot has not been detected, the calibration control unit is arranged to configure an increase of power supply of the at least one line driver.

6. The integrated circuit device of claim 2 wherein the at least one calibration module further comprises a calibration control unit arranged to:
   receive from the voltage comparator the indication of the output signal; and based thereon, calibrate the power supply of the at least one line driver, based at least partly on the received indication.

7. The integrated circuit device of claim 6 wherein, upon receipt of an indication that a voltage overshoot has been detected, the calibration control unit is arranged to configure a decrease of power supply of the at least one line driver.

8. The integrated circuit device of claim 7 wherein, upon receipt of an indication that a voltage overshoot has not been detected, the calibration control unit is arranged to configure an increase of power supply of the at least one line driver.

9. The integrated circuit device of claim 6 wherein, upon receipt of an indication that a voltage overshoot has not been detected, the calibration control unit is arranged to configure an increase of power supply of the at least one line driver.

10. The integrated circuit device of claim 2 wherein, upon receipt of an indication that a voltage overshoot has not been detected, the calibration control unit is arranged to configure an increase of power supply of the at least one line driver.

11. A calibration module for calibrating an impedance of at least one on-die interconnect line driver in order to adaptively match an impedance between the at least one on-die interconnect line driver and at least one on-die interconnect line conjugated thereto, the at least one calibration module being arranged to:
   receive an indication of an output signal of the at least one line driver;
   compare the received indication of the output signal to a reference signal; and
   detect at least one from a group consisting of:
      a presence of a voltage overshoot of the output signal of the at least one line driver, and upon said detection of the presence of the voltage overshoot, cause a power supply of the at least one line driver to be decreased; and
      an absence of a voltage overshoot of the output signal of the at least one line driver, and upon said detection of the absence of the voltage overshoot, cause the power supply of the at least one line driver to be increased.

12. A method for calibrating an impedance of at least one on-die interconnect line driver in order to adaptively match an impedance between the at least one on-die interconnect line driver and at least one on-die interconnect line coupled thereto, the method comprising:
   receiving an indication of an output signal of the at least one line driver;
   comparing the received indication of the output signal to a reference signal; and
   detecting at least one from a group consisting of:
      a presence of a voltage overshoot of the output signal of the at least one line driver, and upon said detection of the presence of the voltage overshot, causing a power supply of the at least one line driver to be decreased; and
   an absence of a voltage overshoot of the output signal of the at least one line driver, and upon said detection of the absence of the voltage overshoot, causing the power supply of the at least one line driver to be increased.

* * * * *